United States Patent
Henry et al.

(10) Patent No.: US 8,340,998 B2
(45) Date of Patent: Dec. 25, 2012

(54) ENTERPRISE OPPORTUNITY ASSESSMENT

(75) Inventors: Todd R. Henry, Waxhaw, NC (US);
James P. Ragnone, Davidson, NC (US);
Scott T. Russell, Huntersville, NC (US);
Timothy P. Quinn, Waxhaw, NC (US)

(73) Assignee: Bank of America Corporation,
Charlotte, NC (US)

( * ) Notice: Subject to any disclaimer, the term of this patent is extended or adjusted under 35 U.S.C. 154(b) by 0 days.

(21) Appl. No.: 13/116,857

(22) Filed: May 26, 2011

(65) Prior Publication Data

US 2012/0303409 A1  Nov. 29, 2012

(51) Int. Cl.
*G06Q 40/00* (2012.01)

(52) U.S. Cl. ............................ 705/7.11; 705/7.42

(58) Field of Classification Search ............ 705/7, 7.11, 705/7.42
See application file for complete search history.

(56) References Cited

U.S. PATENT DOCUMENTS

| | | | |
|---|---|---|---|
| 7,162,427 B1 * | 1/2007 | Myrick et al. | 705/348 |
| 7,624,023 B2 | 11/2009 | Clay et al. | |
| 8,121,889 B2 * | 2/2012 | Casco-Arias et al. | 705/7.41 |
| 2004/0143470 A1 * | 7/2004 | Myrick et al. | 705/7 |
| 2004/0230506 A1 * | 11/2004 | Casco-Arias et al. | 705/35 |
| 2006/0026055 A1 * | 2/2006 | Gascoigne et al. | 705/10 |
| 2008/0215419 A1 | 9/2008 | Vayghan et al. | |

* cited by examiner

*Primary Examiner* — Thomas Dixon
*Assistant Examiner* — Benjamin S Fields
(74) *Attorney, Agent, or Firm* — Baker Botts L.L.P.

(57) ABSTRACT

In some embodiments, a market assessment system comprises a market opportunity engine, a market capture engine, a comparison engine, and an attainability engine. The market opportunity engine is operable to provide an opportunity measurement for each market of a plurality of markets. The market capture engine operable to provide an actual capture measurement for each market of the plurality of markets. The actual capture measurement indicates an amount of the product actually provided by the enterprise within each market. The comparison engine operable to compare a first market of the plurality of markets to one or more different markets of the plurality of markets to determine one or more comparable markets. The attainability engine operable to calculate an attainable opportunity measurement for the first market based on the actual capture measurement and the opportunity measurement for each of the one or more comparable markets.

20 Claims, 3 Drawing Sheets

ENTERPRISE OPPORTUNITY ASSESSMENT

TECHNICAL FIELD

The present disclosure relates to opportunity modeling and more specifically to enterprise opportunity assessment.

BACKGROUND

Enterprises may offer a variety of products in a variety of markets. Enterprises may compete with each other by offering similar products in the same markets. Each market may provide a limited amount of opportunity, and different enterprises may compete to obtain as much of that opportunity as possible.

SUMMARY

In some embodiments, a market assessment system comprises a market opportunity engine, a market capture engine, a comparison engine, and an attainability engine. The market opportunity engine is operable to provide an opportunity measurement for each market of a plurality of markets. The market capture engine operable to provide an actual capture measurement for each market of the plurality of markets. The actual capture measurement indicates an amount of the product actually provided by the enterprise within each market. The comparison engine operable to compare a first market of the plurality of markets to one or more different markets of the plurality of markets to determine one or more comparable markets. The attainability engine operable to calculate an attainable opportunity measurement for the first market based on the actual capture measurement and the opportunity measurement for each of the one or more comparable markets.

Certain embodiments may provide one or more technical advantages. A technical advantage of one embodiment may include the capability to assess the enterprise's ability to capture attainable customers on a market and product basis. A technical advantage of one embodiment may also include the capability to explain enterprise performance on a market and sub-market basis. A technical advantage of one embodiment may also include the capability to inform decisionmakers on how to attract more customers.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

Figure 1:
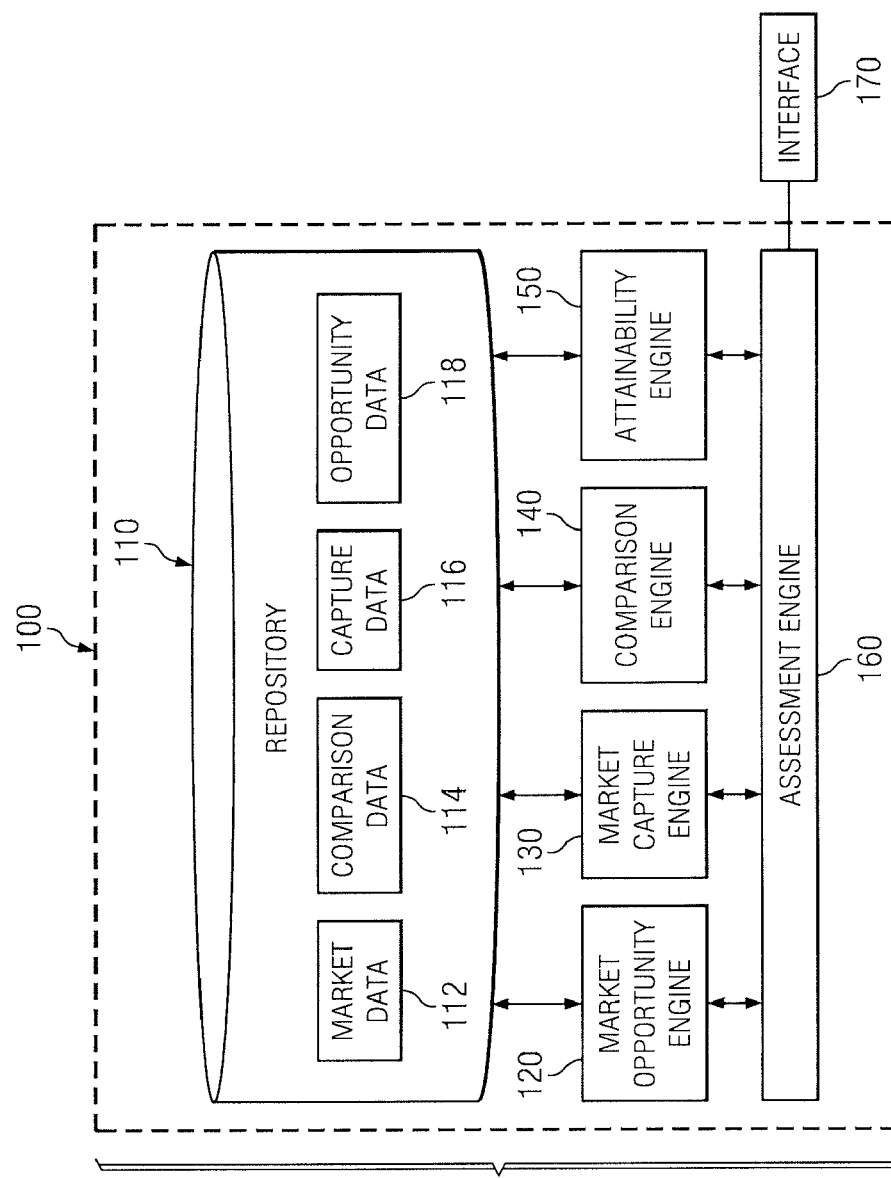
FIG. 1 shows a market assessment system according to one embodiment.
Figure 1:
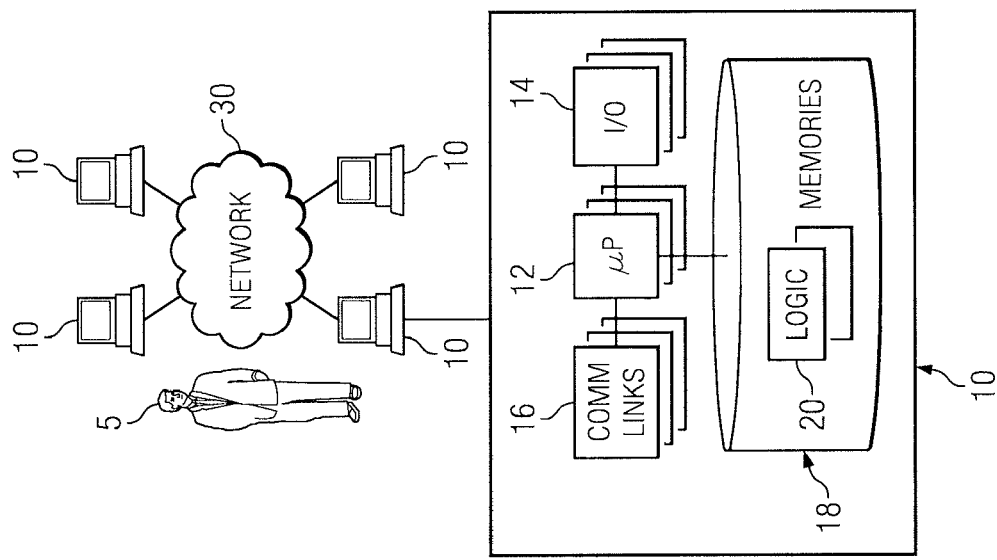

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An enterprise may include any individual, business, or organization. One example of an enterprise may include a financial enterprise. A financial enterprise may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio.

A financial enterprise may provide a variety of financial products. Examples of financial products may include, but are not limited to, account services such as maintaining accounts, receiving deposits, crediting accounts, debiting accounts, extending credit, purchasing securities, providing insurance, and portfolio management.

The financial enterprise may offer financial products to a variety of different customers across different markets. A market may include any division of customers of the financial enterprise. One example of a market is a geographic market. Examples of geographic markets may include, but are not limited to, countries, regions, states, counties, cities, metropolitan areas, and block groups. A sub-market may include any division of a market. For example, counties may be sub-markets of a state market.

Customers may be identified in any suitable manner. For example, customers may be identified as individuals, families, households, and/or businesses. Each market may include both existing and potential customers. An existing customer is a customer who receives a product from the financial enterprise. A potential customer is a customer who does not receive the product from the financial enterprise. A customer may qualify as both an existing customer and a potential customer at the same time. For example, a customer may be an existing customer of a first financial product and a potential customer of a second financial product.

An enterprise may be interested in knowing how well the enterprise is attracting customers for different products in different markets. The enterprise may also be interested in identifying underperforming markets or products that could benefit from additional efforts to attract customers. Accordingly, teachings of certain embodiments recognize the ability to assess the enterprise's ability to capture attainable customers on a market and product basis. Teachings of certain embodiments also recognize that understanding enterprise performance on a market and sub-market basis may inform decisionmakers on how to attract more customers.

FIG. 1 shows a market assessment system 100 according to one embodiment. The market assessment system 100 of FIG. 1 features a repository 110, a market opportunity engine 120, a market capture engine 130, a comparison engine 140, an attainability engine 150, and an assessment engine 160, that may be implemented by one or more computer systems 10.

Users 5 may access market assessment system 100 through computer systems 10. Users 5 may include any individual, group of individuals, entity, machine, and/or mechanism that interacts with computer systems 10. Examples of users 5 include, but are not limited to, a manager, executive, review board, accountant, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses. Examples of a business may include, but are not limited to, financial enterprises, agriculture and mining businesses, manufacturers, real estate companies, retailers and distributors, service businesses, transportation companies, and utility companies. A business may include both for-profit and not-for-profit businesses. An organization may also include multiple businesses. For example, an organization may control businesses in multiple jurisdictions throughout the world. Examples of organizations are not limited to businesses. For example, an organization can itself be a government entity. In one example embodiment, market assessment system 100 is associated with a financial enterprise, and user 5 is an employee or representative of the financial enterprise.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Repository 110 stores market data 112, comparison data 114, capture data 116, and opportunity data 118. Market data 112 identifies markets and sub-markets. In some embodiments, market data 112 organizes markets and sub-markets according to a hierarchy. In one example involving some geographic markets, each block group may be organized under a census tract, each census tract may be organized within a county, and each county may be organized within a state. Teachings of certain embodiments recognize that organizing markets in a hierarchy may allow information to be viewed at a high level for general understanding as well as at a deeper level for a more detailed understanding.

Market data 112 may include different information about each market. As one example, market data 112 may include demographic data such as population density, average age, average income, and household size. As another example, market data 112 may also include information about an enterprise's activities within each market. For example, market data 112 may identify which products are offered in each market. As another example, market data 112 may identify whether the enterprise has physical operations in the market, such as a branch or automated teller machine (ATM).

Comparison data 114 may include information identifying comparable markets among those markets identified by market data 112. Markets may be considered comparable based on a variety of factors. In some embodiments, markets are deemed comparable if they have similar demographic characteristics, such as similar population densities and income levels. In some embodiments, markets are deemed comparable if an enterprise has similar activities in the markets, such as a similar number of local branches or ATMs.

Capture data 116 may include information identifying the quantity of products provided by an enterprise within each market. In some embodiments, capture data 116 may be divided on a product by product basis. Capture data 116 may be expressed in a variety of formats. In some embodiments, capture data 116 expresses the number of customers that receive a specified product, such as a number of individuals or a number of households. In some embodiments, capture data 116 expresses an economic volume of a specified product, such as an amount of revenue or balances received by the enterprise from the market.

Opportunity data 118 may include information identifying an opportunity measurement for each market. In some embodiments, the opportunity measurement indicates an amount of opportunity for an enterprise to provide a product within each market. Opportunity data 118 may be expressed in a variety of formats. In some embodiments, opportunity data 118 represents the number of potential and/or actual customers in the market, such as a number of individuals or a number of households. In some embodiments, opportunity data 118 expresses an economic volume of a specified product, such as an amount of potential and/or actual revenue or balances in the market. As one example, opportunity data 118 may include both the number of customers and the economic volume in the market. For example, an actual customer may only send 25% of her investment business to the enterprise, and opportunity data 118 may indicate that there may be more available opportunity with an existing customer of the enterprise.

In some embodiments, the amount of opportunity represents a theoretical maximum of activity based on the entire population of the market. In other embodiments, the amount of opportunity includes a subset of the entire population. Teachings of certain embodiments recognize the capability to filter opportunity information for each market. As one example, the amount of opportunity may be filtered based on whether certain individuals meet the enterprise's qualifications (e.g., whether an individual meets credit score requirements). As another example, the amount of opportunity may be filtered based how many customers within a market are willing to consider sending their business to a new enterprise. The ability to filter market opportunity is described in greater detail with respect to FIG. 2.

Market opportunity engine 120 provides an opportunity measurement for each market. In some embodiments, opportunity measurements may be stored in repository 110 as opportunity data 118. Market opportunity engine 120 may also provide opportunity measurements to assessment engine 160. In some embodiments, market opportunity engine 120 may filter opportunity information for each market. The ability to filter market opportunity is described in greater detail with respect to FIG. 2.

Market capture engine 130 provides information identifying an actual capture measurement for each market. The actual capture measurement indicates an amount of product actually provided by the enterprise within each market. In some embodiments, actual capture measurements may be stored in repository 110 as opportunity data 118. Market capture engine 130 may also provide actual capture measurements to assessment engine 160.

Comparison engine 140 identifies comparable markets for each market identified in market data 112. Comparison engine 140 may compare markets based on a variety of factors, such as demographic characteristics and the enterprise's activities in each market. In some embodiments, comparable market information may be stored in repository 110 as comparison data 114. Comparison engine 140 may also provide comparable market information to assessment engine 160.

Attainability engine 150 calculates an attainable opportunity measurement for each market identified in market data 112. An attainable opportunity measurement may represent the amount of opportunity a market should be able to capture based on how well comparable markets capture opportunity. In some embodiments, attainability engine 150 calculates an attainable opportunity measurement for each market using comparison data 114, capture data 116, and opportunity data 118. For example, in one embodiment, attainability engine 150 identifies, for a first market, every comparable market using comparison data 114. In this example, the first market may have comparable markets A, B, and C. The enterprise's capture of the opportunity in each comparable market may be determined from capture data 116 and opportunity data 118. The enterprise's capture in each comparable market may be predictive of the attainable opportunity in the first market. In one example, if comparable markets A, B, and C are capturing 10%, 12%, and 14% of the opportunity, respectively, then the first market may be able to attain an average opportunity amount of the comparable markets, or approximately 12% of the opportunity in its market.

Assessment engine 160 generates an assessment of each market. In some embodiments, assessment engine 160 assesses how well each market captures opportunity. Returning to the previous example, the first market may only capture 4% of the opportunity in the market. In this example, assessment engine 160 may compare the first market's 4% capture measurement with its 12% attainable opportunity measurement and determine that the first market is underperforming compared to markets A, B, and C.

In some embodiments, assessment engine 160 may report information such as market data 112, comparison data 114, capture data 116, opportunity data 118, and any other information or assessments to interface 170. Interface 170 may allow user 5 to review and investigate this information. Returning to the previous example, user 5 may use interface 170 to investigate which sub-markets and products are causing the first market to underperform in comparison with markets A, B, and C. The ability to provide information such as market data 112, comparison data 114, capture data 116, opportunity data 118, and any other information or assessments through interface 170 is described in greater detail with respect to FIG. 3.

In operation, according to one embodiment, market opportunity engine 120 provides an opportunity measurement for each market identified in market data 112. This opportunity measurement may be stored in opportunity data 118. Market capture engine 130 provides an actual capture measurement for each market identified in market data 112. This actual capture measurement may be stored in capture data 116. Comparison engine 140 identifies comparable markets for each market identified in market data 112. This comparable market information may be stored in comparison data 114. Attainability engine 150 calculates an attainable opportunity measurement for each market identified in market data 112. In some embodiments, attainability engine 150 calculates an attainable opportunity measurement for each market using comparison data 114, capture data 116, and opportunity data 118. Assessment engine 160 generates an assessment of each market. In some embodiments, assessment engine 160 may report information such as market data 112, comparison data 114, capture data 116, opportunity data 118, and any other information or assessments to interface 170.

Figure 2:
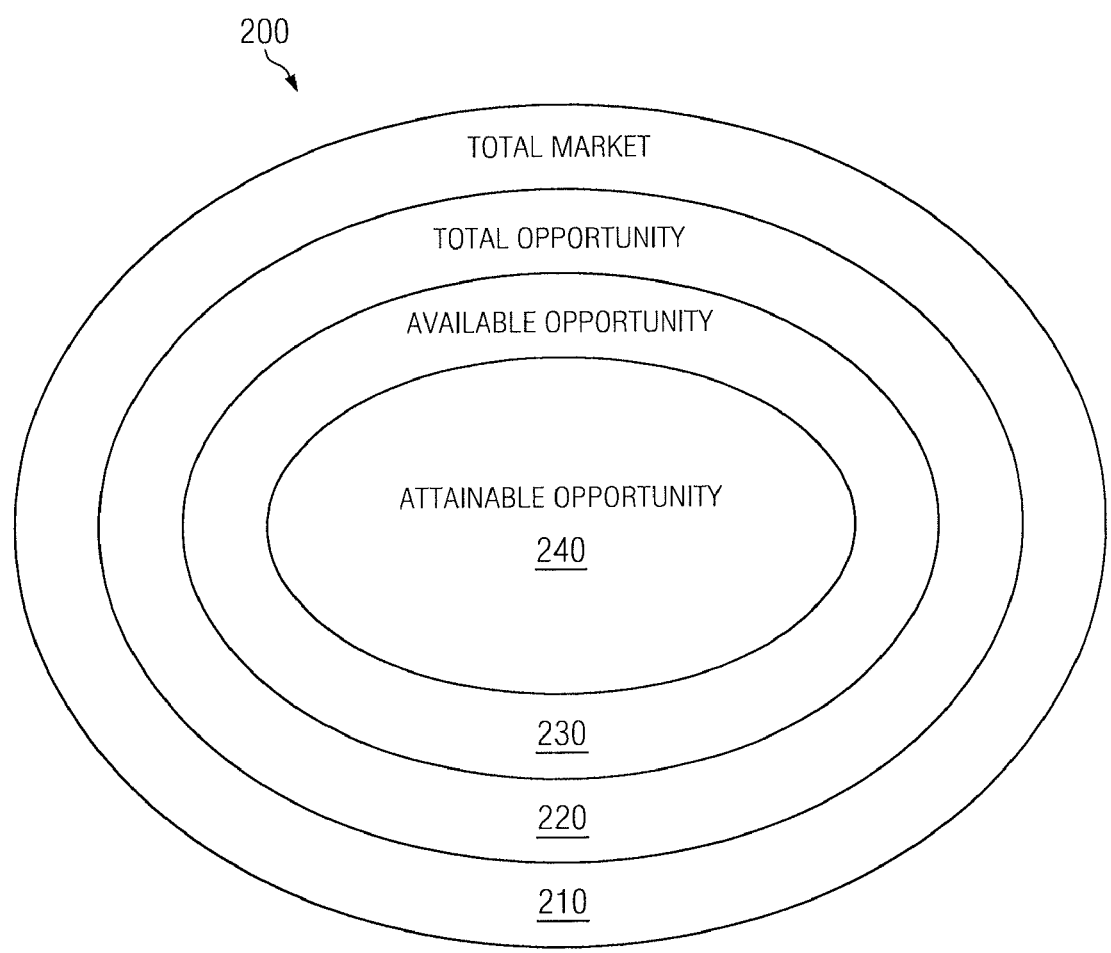
FIG. 2 shows an example opportunity diagram according to one embodiment.

FIG. 2 shows an example opportunity diagram 200 according to one embodiment. Total market 210 is identified in the outermost circle. In this example, total market 210 represents a theoretical maximum of activity in a market based on the entire population of the market.

The entire population of the market, however, may include subpopulations that do not qualify as opportunity to the enterprise. Accordingly, teachings of certain embodiments recognize the ability to filter total market 210 down to total opportunity 220. Total opportunity 220 represents the total opportunity available to the enterprise within total market 210. For example, total opportunity 220 does not include populations that do not satisfy the enterprise's customer requirements, such as minimum balance and minimum credit score requirements. In some embodiments, total market 210 may be filtered down to total opportunity 220 based on individual or aggregated demographic data. Teachings of certain embodiments recognize that such populations may be omitted from consideration because such populations would not be accepted by the enterprise.

Total opportunity 220 includes all potential and existing customers within total market 210. Not all potential and existing customers, however, make their business available to new enterprises. Some customers, for example, are content to keep their business with their current enterprise even if better opportunities are available elsewhere. In some embodiments, the number of customers who are willing to consider new opportunities may be approximated based on churn percentages for previous years or other time periods. Accordingly, teachings of certain embodiments recognize the ability to filter total opportunity 220 down to available opportunity 230.

Available opportunity 230 represents the amount of opportunity available over a particular time period. For example, only thirty percent of potential and existing customers may make their business available to new enterprises over the course of a given year. Markets may be competitive, however, and no enterprise can be expected to attain 100% of available opportunity. Accordingly, teachings of certain embodiments recognize the ability to filter available opportunity 230 down to attainable opportunity 240.

Attainable opportunity may represent the amount of opportunity a market should be able to capture based on how well comparable markets capture opportunity. For example, for a given market, an enterprise may be expected to attain 20% of available market based on how well the enterprise captures opportunity in comparable markets.

Thus, as shown in FIG. 2, teachings of certain embodiments recognize the capability to filter from total market 210 to total opportunity 220 to available opportunity 230 to attainable opportunity 240. Teachings of certain embodiments recognize that filtering various opportunity measurements may provide more accurate opportunity measurements. In some embodiments, measurements for total market 210, total opportunity 220, available opportunity 230, and/or attainable opportunity 240 may be stored as part of opportunity data 118. Furthermore, in some embodiments, market opportunity engine 120, comparison engine 140, attainability engine 150, and assessment engine 160 may refer to any of total market 210, total opportunity 220, available opportunity 230, and/or attainable opportunity 240 in making determinations. In some embodiments, measurements for total market 210, total opportunity 220, available opportunity 230, and/or attainable opportunity 240 may be provided through interface 170.

Figures 3, 4:
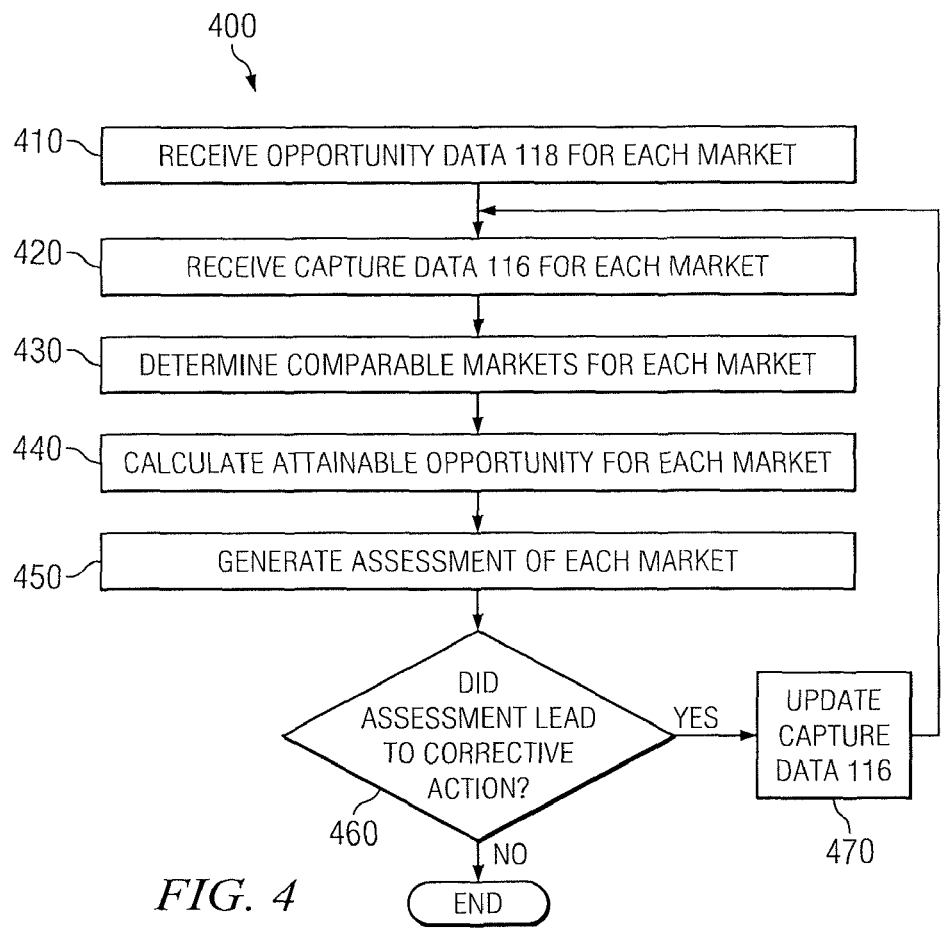
FIG. 3 shows an enterprise assessment tool according to one embodiment.
FIG. 4 shows a method for assessing enterprise performance according to one embodiment.

FIG. 3 shows an enterprise assessment tool 300 according to one embodiment. In some embodiments, enterprise assessment tool 300 may represent a user interface provided by interface 170 of FIG. 1.

In the illustrated embodiment, enterprise assessment tool 300 includes a menu 310 and an information display 320. Menu 310 includes menu options 312, 314, 316, and 318. In the illustrated embodiment, menu option 312 allows user 5 to select a market type of interest. Example selections from menu option 312 include country, state, county, and census tract. Menu option 314 allows user 5 to select a particular market based on the selection from menu option 312. For example, if user 5 selects "state" from menu option 312, user 5 may select a particular state from menu option 314, such as Texas or Iowa.

Menu option 316 allows user 5 to select a sub-market type to be displayed in information display 320. As one example, user 5 may select "state" from menu option 312 and "Texas" from menu option 314. If, in this example, user 5 selects "county" from menu option 316, then information display 320 may display information for every county in Texas.

In some embodiments, the available selections under menu option 316 depend on selected market type in menu option 312. For example, if "country" is selected from menu option 312, then menu option 316 may allow user 5 to select from state, county, census tract, and block group. If county is selected from menu option 312, on the other hand, country and state may not be available as sub-markets in menu option 316.

Menu option 318 allows user 5 to filter information by product. Example selections from menu option 318 may include all, checking accounts, savings accounts, credit cards, mutual funds, insurance policies, etc. In some embodiments, menu 310 may include additional filters to further refine product selection or market selection. For example, in some embodiments information may be filtered by business segment. For example, individual customers may be filtered from business customers, or high-income customers may be filtered from the general population. In some embodiments, there may be products that are only applicable to certain business segments (e.g., inventory loans are only available to business customers).

In some embodiments, additional filters may be provided. For example, information may be filtered according to relationship characteristics. As one example, information may be filtered based on customer primacy (e.g., customers who have their primary checking account with the financial institution). As another example, information may be filtered based on channel preferences (e.g., branch users, on-line users, phone-channel users). Information may also be filtered based on customer segmentation as well as a variety of other factors.

Information display 320 provides information about the sub-markets and products selected in menus 310. In the illustrated example, information display 320 provides capture, attainable market, and assessment information for sub-markets 1-6. In some embodiments, capture information may be provided to information display 320 from market capture engine 130 and/or capture data 116, attainable market information may be provided to information display 320 from attainability engine 150 and/or opportunity data 118, and assessment information may be provided to information display 320 from assessment engine 160.

FIG. 4 shows a method 400 for assessing enterprise performance according to one embodiment. At step 410, opportunity data 118 is received for each market. At step 420, capture data 116 is received for each market. At step 430, comparable markets are determined for each market. In some embodiments, information identifying comparable markets may be stored in comparison data 114.

At step 440, attainable opportunity is calculated for each market. At step 450, an assessment of each market is generated. In some circumstances, the assessment may justify corrective actions on behalf of the enterprise. For example, if a particular market is under performing, the enterprise may take steps to improve market performance (e.g., increasing advertising in the market, adding a branch office to the market, etc.). If the assessment in step 450 results in corrective actions at step 460, then capture data 116 may be updated at step 470 to reflect how well the enterprise is capturing opportunity post-corrective actions. If capture data 116 is updated at step 470, then steps 420, 430, 440, and 450 may be repeated.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C.§112 as it exists on the date of filing hereof unless the words "means for" or "step for" are explicitly used in the particular claim.

What is claimed is:

1. A market assessment system, comprising:
    a storage element that, when the system is operating, stores software;
    a processing element that, when executing the software:
    provides an opportunity measurement for each market of a plurality of markets, the opportunity measurement indicates an amount of opportunity for an enterprise to provide a product within each market;
    provides an actual capture measurement for each market of the plurality of markets, the actual capture measurement indicates an amount of the product actually provided by the enterprise within each market;
    compares a first market of the plurality of markets to one or more different markets of the plurality of markets to determine one or more comparable markets; and
    calculates an attainable opportunity measurement for the first market based on the actual capture measurement and the opportunity measurement for each of the one or more comparable markets.

2. The system of claim 1, wherein the processing element, when executing the software, further generates an assessment for the first market based on the difference between the attainable opportunity measurement for the first market and the actual capture measurement for the first market.

3. The system of claim 1, wherein the actual capture measurement comprises a revenue or balance measurement for the product within each market.

4. The system of claim 1, wherein the actual capture measurement comprises a household measurement that indicates a number of households that receive the product from the enterprise.

5. The system of claim 1, wherein the opportunity measurement indicates an amount of opportunity to provide the product within each market to potential customers of the enterprise who do not currently receive the product.

6. The system of claim 1, wherein the opportunity measurement indicates an amount of opportunity to provide additional volume of the product within each market to customers of the enterprise who currently receive the product.

7. The system of claim 1, wherein each market of the plurality of markets represents a block group.

8. A non-transitory computer readable medium comprising logic that, when executed by a processor:
    receives an opportunity measurement for each market of a plurality of markets, the opportunity measurement indicates an amount of opportunity for an enterprise to provide a product within each market;
    receives an actual capture measurement for each market of the plurality of markets, the actual capture measurement indicates an amount of the product actually provided by the enterprise within each market;
    compares a first market of the plurality of markets to one or more different markets of the plurality of markets to determine one or more comparable markets; and
    calculates an attainable opportunity measurement for the first market based on the actual capture measurement and the opportunity measurement for each of the one or more comparable markets.

9. The logic of claim 8 that, when executed by the processor, further generates an assessment for the first market based on the difference between the attainable opportunity measurement for the first market and the actual capture measurement for the first market.

10. The logic of claim 8, wherein the actual capture measurement comprises a revenue or balance measurement for the product within each market.

11. The logic of claim 8, wherein the actual capture measurement comprises a household measurement that indicates a number of households that receive the product from the enterprise.

12. The logic of claim 8, wherein the opportunity measurement indicates an amount of opportunity to provide the product within each market to potential customers of the enterprise who do not currently receive the product.

13. The logic of claim 8, wherein the opportunity measurement indicates an amount of opportunity to provide additional volume of the product within each market to customers of the enterprise who currently receive the product.

14. A method, comprising:
    receiving an opportunity measurement for each market of a plurality of markets, the opportunity measurement indicates an amount of opportunity for an enterprise to provide a product within each market;
    receiving an actual capture measurement for each market of the plurality of markets, the actual capture measurement indicates an amount of the product actually provided by the enterprise within each market;

comparing, using a processor, a first market of the plurality of markets to one or more different markets of the plurality of markets to determine one or more comparable markets; and calculating, using the processor, an attainable opportunity measurement for the first market based on the actual capture measurement of the one or more comparable markets and the opportunity measurement of each of the one or more comparable markets.

15. The method of claim 14, further comprising generating an assessment for the first market based on the difference between the attainable opportunity measurement for the first market and the actual capture measurement for the first market.

16. The method of claim 14, wherein the actual capture measurement comprises a revenue or balance measurement for the product within each market.

17. The method of claim 14, wherein the actual capture measurement comprises a household measurement that indicates a number of households that receive the product from the enterprise.

18. The method of claim 14, wherein the opportunity measurement indicates an amount of opportunity to provide the product within each market to potential customers of the enterprise who do not currently receive the product.

19. The method of claim 14, wherein the opportunity measurement indicates an amount of opportunity to provide additional volume of the product within each market to customers of the enterprise who currently receive the product.

20. The method of claim 14, wherein each market of the plurality of markets represents a block group.

\* \* \* \* \*